(12) United States Patent
Nguyen

(10) Patent No.: US 7,897,658 B2
(45) Date of Patent: Mar. 1, 2011

(54) AQUEOUS COATING COMPOSITIONS

(75) Inventor: Lang H. Nguyen, Lowell, MA (US)

(73) Assignee: Cabot Corporation, Boston, MA (US)

( * ) Notice: Subject to any disclaimer, the term of this patent is extended or adjusted under 35 U.S.C. 154(b) by 420 days.

(21) Appl. No.: 10/694,975

(22) Filed: Oct. 28, 2003

(65) Prior Publication Data

US 2005/0087104 A1 Apr. 28, 2005

(51) Int. Cl.
*C08K 9/04* (2006.01)
*C08K 5/42* (2006.01)
*C08L 33/08* (2006.01)

(52) U.S. Cl. ......... 523/215; 524/157; 524/158; 524/556; 524/560; 524/564; 523/200

(58) Field of Classification Search ............ 524/157, 524/158, 556, 560, 564; 523/215, 200
See application file for complete search history.

(56) References Cited

U.S. PATENT DOCUMENTS

| | | | |
|---|---|---|---|
| 4,383,062 A | 5/1983 | Saad et al. | |
| 4,530,961 A | 7/1985 | Nguyen et al. | |
| 4,909,853 A | 3/1990 | Wienkenhover et al. | |
| 5,184,148 A | 2/1993 | Suga et al. | |
| 5,215,576 A | 6/1993 | Carrick | |
| 5,266,622 A * | 11/1993 | Mazanek et al. ............ | 524/131 |
| 5,418,277 A | 5/1995 | Ma | |
| 5,571,311 A | 11/1996 | Belmont | |
| 5,609,671 A | 3/1997 | Nagasawa | |
| 5,630,868 A | 5/1997 | Belmont et al. | |
| 5,632,927 A | 5/1997 | Ferrier et al. | |
| 5,672,198 A * | 9/1997 | Belmont ............ | 106/31.75 |
| 5,698,016 A | 12/1997 | Adams et al. | |
| 5,707,432 A | 1/1998 | Adams et al. | |
| 5,713,988 A | 2/1998 | Belmont et al. | |
| 5,736,606 A | 4/1998 | Yanagi et al. | |
| 5,803,959 A | 9/1998 | Johnson et al. | |
| 5,837,045 A * | 11/1998 | Johnson et al. ............ | 106/31.85 |
| 5,885,335 A | 3/1999 | Adams et al. | |
| 5,922,118 A | 7/1999 | Johnson et al. | |
| 5,976,233 A | 11/1999 | Osumi et al. | |
| 6,042,643 A | 3/2000 | Belmont et al. | |
| 6,099,632 A | 8/2000 | Nagasawa et al. | |
| 6,150,433 A | 11/2000 | Tsang et al. | |
| 6,171,382 B1 | 1/2001 | Stubbe et al. | |
| 6,221,143 B1 | 4/2001 | Palumbo | |
| 6,235,829 B1 | 5/2001 | Kwan | |
| 6,368,397 B1 | 4/2002 | Ichizawa et al. | |
| 6,402,825 B1 | 6/2002 | Sun | |
| 6,524,383 B2 | 2/2003 | Komatsu et al. | |
| 6,569,231 B1 | 5/2003 | Mathias et al. | |
| 6,599,356 B2 | 7/2003 | Komatsu et al. | |
| 6,685,769 B1 | 2/2004 | Karl et al. | |
| 7,022,759 B2 * | 4/2006 | Martin et al. .................. | 524/513 |
| 2002/0075369 A1 | 6/2002 | Ota et al. | |
| 2002/0147252 A1 | 8/2002 | Johnson et al. | |
| 2003/0191231 A1* | 10/2003 | Martin et al. ................. | 524/513 |

FOREIGN PATENT DOCUMENTS

| | | |
|---|---|---|
| WO | WO 01/36547 | 5/2001 |
| WO | WO 0136547 A1 * | 5/2001 |
| WO | WO 02/33008 | 4/2002 |
| WO | WO 0233008 A1 * | 4/2002 |

OTHER PUBLICATIONS

PCT/US2004/034956 Oct. 21, 2004 Written Opinion.
PCT/US2004/034956 Nov. 3, 2005 International Search Report.
JP 2000-053885 to Minolta Co. Ltd. Published Feb. 22, 2000. Abstract Only (from Patent Abstracts of Japan).
JP 2000-309731 to Minolta Co. Ltd. Published Nov. 7, 2000 Abstract Only (from Patent Abstracts of Japan).

\* cited by examiner

*Primary Examiner* — Michael M Bernshteyn

(57) ABSTRACT

The present invention relates to a dispersant composition comprising at least one non-ionic surfactant and at least one polymer comprising at least one salt of a carboxylic acid group. Also disclosed are pigment compositions and aqueous coating compositions comprising the dispersant composition.

18 Claims, No Drawings

AQUEOUS COATING COMPOSITIONS

BACKGROUND OF THE INVENTION

1. Field of the Invention

The present invention relates to a dispersant composition comprising at least one non-ionic surfactant and at least one polymer comprising at least one salt of a carboxylic acid group. The present invention further relates to a modified pigment composition and an aqueous coating composition comprising the dispersant compositions.

2. Description of the Related Art

Coating compositions are used for decorative, protective, and functional treatments of many kinds of surfaces. These surfaces include coils, metals, appliances, furniture, hardboard, lumber and plywood, marine, automobile, cans, and paperboard. Some coatings, such as those on undersea pipelines, are for protective purposes. Others, such as exterior automobile coatings, fulfill both decorative and protective functions. Still others provide friction control on boat decks or car seats. Some coatings control the fouling of ship bottoms, others protect food and beverages in cans. Silicon chips, printed circuit panels, coatings on wave-guide fibers for signal transmission, and magnetic coatings on videotapes and computer disks are among many so-called hi-tech applications for coatings.

Surface coating compositions are generally more or less viscous liquids with three base components: a film-forming substance or combination of substances called the resin or binder, a pigment or combination of pigments, and a volatile liquid. The combination of resin and volatile liquid is often referred to as the vehicle. Vehicles may be aqueous or non-aqueous and may be in a solution form or as a dispersion of fine binder particles in a non-solvent. The components and manufacturing of coating compositions such as aqueous coatings are further discussed in the Concise Encyclopedia of Polymers, Science and Engineering, pages. 160-171 (1990), which is incorporated herein by reference.

Pigments are finely divided, insoluble, solid particles dispersed in the coating vehicle and are distributed throughout the resin or binder in the final film. A wide variety of conventional black and colored pigments have been used in coating compositions. In addition, aqueous and non-aqueous inks and coating compositions comprising modified carbon products having attached organic groups are described in U.S. Pat. Nos. 5,672,198 and 5,713,988, both incorporated in their entireties herein by reference.

Surfactants may also be added to coating compositions to help improve performance. Typically, these surfactants are used in combination with the pigments of the coating compositions and, as such, are therefore referred to as dispersants. Several different classes or types of dispersants have been used in coating compositions. The choice of dispersant is dependent on a variety of factors, including the properties of the pigment, particle size, and the type of resin or binder. However, the dispersant can often have a negative impact on properties such as color development. Therefore, the amount of dispersant must be adjusted for the components used in order to obtain coating compositions with good overall properties.

Thus, while dispersants have been used in coating compositions, there remains a need for dispersant compositions which enable specific types of pigments to be dispersed in an aqueous vehicle while also resulting in good color performance.

SUMMARY OF THE INVENTION

The present invention relates to a dispersant composition comprising i) at least one non-ionic surfactant and ii) at least one polymer comprising at least one salt of a carboxylic acid group. Preferably, the non-ionic surfactant is insoluble in water, such as a water insoluble polyalkylene oxide.

The present invention further relates to a pigment composition comprising a) at least one pigment, and b) at least one dispersant composition as described herein. Preferably the pigment is a modified carbon product comprising a carbon product having attached at least one organic group such as an anionic group. The pigment composition may be either in a dry form or present in an aqueous vehicle.

The present invention further relates to an aqueous coating composition comprising a) an aqueous vehicle comprising a water-based resin and an aqueous solvent, b) at least one pigment, and c) at least one dispersant composition as described herein.

It is to be understood that both the foregoing general description and the following detailed description are exemplary and explanatory only and are intended to provide further explanation of the present invention, as claimed.

DETAILED DESCRIPTION OF THE INVENTION

The present invention relates to dispersant compositions, as well as to pigment and aqueous coating compositions comprising the dispersant compositions.

The dispersant composition of the present invention comprises at least one non-ionic surfactant and at least one polymer comprising at least one salt of a carboxylic acid group. Additionally, the dispersant composition may further comprise a solvent. The solvent may be aqueous or non-aqueous, but is preferably an aqueous solvent—i.e., the solvent comprises water and, optionally, water soluble or miscible solvents. Preferably, the solvent is water, and the dispersant composition is a water-based dispersant composition.

Preferably, the non-ionic surfactant is a polyalkylene oxide. The polyalkylene oxide can be any homopolymer or copolymer comprising an alkylene oxide group, such as an ethylene oxide or propylene oxide group. The polymer may also be a branched or linear polymer. Preferably, the polyalkylene oxide is a polymer comprising alkylene oxide groups having from 1 to 12 carbons. For example, the polyalkylene oxide may be a polymer comprising a —$CH_2$—$CH_2$—O— group, a —$CH(CH_3)$—$CH_2$—O— group, a —$CH_2$—$CH(CH_3)$—O— group, or a —$CH_2$—$CH_2$—$CH_2$—O— group. Combinations of these groups are also possible. In addition, mixtures of polyalkylene oxides may also be used.

Typically, polyalkylene oxide polymers are prepared so as to contain terminal —OH groups. These terminal groups can be further reacted or capped to form polymers having —OR groups. Examples of capping groups are well known to one skilled in the art. The polyalkylene oxide used in the dispersant composition of the present invention may be either an uncapped or a capped polymer. Preferably, for the solubility reasons discussed in more detail below, the polyalkylene oxide polymer comprises a capping group. The percentage of —OH groups that are capped can be any amount. Preferably, the polyalkylene oxide is greater than 50% capped, more preferably greater than 75% capped, and most preferably greater than 90% capped. The capping group can be any of those known in the art but is preferably a C1-C20 alkyl or aryl group, more preferably a C6-C20 alkyl group. Most preferred is a C12-C18 alkyl group.

The dispersant composition of the present invention further comprises at least one polymer comprising at least one salt of a carboxylic acid group. Examples include homo- or copolymers prepared from acrylic or methacrylic acid and polyesters, polyamides, or polycarbonates that contain —COOH end-groups. Preferably, the polymer is a copolymer of acrylic or methacrylic acid and the polymer comprises at least one salt of an acrylic or methacrylic acid repeat group.

The salt may be either an inorganic or an organic salt. Thus, the salt of a carboxylic acid group has the general formula —COO$^-$M$^+$, wherein M$^+$ can be either an inorganic counterion or an organic counterion. Examples include Na$^+$, K$^+$, Li$^+$, NH$_4^+$, and NR'$_4^+$, where R' represents hydrogen or an organic group such as a substituted or unsubstituted aryl and/or alkyl group. Preferably the polymer comprises an ammonium salt of a carboxylic acid group.

Molecular weight determines many properties of both surfactants and polymers, including solubility, viscosity, and stability. Therefore, while the non-ionic surfactant and polymer used in the dispersant composition of the present invention can have any molecular weight, generally, very high molecular weights are not preferred. Thus, the molecular weight of the non-ionic surfactant such as a polyalkylene oxide is preferred to be between about 500 and 200000, more preferably about 1000 to 100000, and most preferably between about 2500 and 10000. The molecular weight of the carboxylic acid group-containing polymer may be similar to that described for the non-ionic surfactant. Preferably, the polymer molecular weight is between about 500 and 100000, more preferably between about 5000 and 50000, and most preferably between about 10000 and 40000.

The dispersant composition, may further comprise additional components, such as antioxidants, biocides, and the like. As described above, in a preferred embodiment, the dispersant composition further comprises an aqueous solvent, such as water. Furthermore, the pH of the composition can be adjusted depending on the intended use of the material. Thus, the dispersant composition may further comprise at least one base. This base may correspond to the salt of the polymer comprising at least one salt of a carboxylic acid. Examples of bases include amines such as ammonia and hydroxide reagents such as a salt having an hydroxide counterion including, but not limited to, sodium hydroxide, potassium hydroxide, lithium hydroxide, and ammonium hydroxide. Other hydroxide salts, as well as mixtures of hydroxide reagents, can also be used. Furthermore, other alkaline reagents may also be used which generate OH$^-$ ions in an aqueous medium. Examples include carbonates such as sodium carbonate, bicarbonates such as sodium bicarbonate, and alkoxides such as sodium methoxide and sodium ethoxide.

The amount of each component can be varied depending on the intended use of the dispersant composition. The amount of non-ionic surfactant is typically between about 5% and 20%, preferably between about 9% and 16%, and more preferably between about 11% and 14%, based on the total weight of the dispersant composition. The amount of polymer comprising at least one salt of a carboxylic acid group is generally between about 3% and 25%, preferably between about 7% and 20%, and more preferably between about 10% and 15%, based on the total weight of the dispersant composition.

As described above, preferably the dispersant composition further comprises an aqueous solvent, such as water. For this preferred embodiment, the % solids of the dispersant composition is preferably greater than 10%, more preferably greater than 15%, and most preferably greater than 25%.

It is preferable that at least one of the components of the dispersant composition be insoluble in water. For example, the non-ionic surfactant may be a water insoluble material. By "insoluble" is meant that at least one of the components does not dissolve in water at room temperature at concentrations greater than 2% and remain soluble under these conditions for a long period of time, such as longer than a day. Insolubility may be a result of many different factors. For example, when the non-ionic surfactant is a polyalkylene oxide, insolubility may be a result of the molecular weight of the polyalkylene oxide, the type of alkylene oxide which comprises the polymer, or the type and level of capping groups. When the non-ionic surfactant is insoluble in water, the polymer comprising at least one salt of carboxylic acid group should be water soluble. Thus, it may be said that the polymer acts as a dispersing or solubilizing agent for the water-insoluble non-ionic surfactant, thereby producing an aqueous solution or dispersion of the insoluble surfactant.

The present invention further relates to a pigment composition comprising at least one pigment and the dispersant composition described above. The pigment may be any pigment known in the art but is preferably a carbonaceous pigment, and, in particular, is a carbon product. Examples of suitable carbon products include, but are not limited to, graphite, carbon black, vitreous carbon, carbon fibers, activated charcoal, and activated carbon. The carbon may be of the crystalline or amorphous type. Finely divided forms of the above are preferred; also, it is possible to utilize mixtures of different carbons. Of these carbon products, carbon black is preferred. The pigment composition may be either in a dry form or may further comprise an aqueous vehicle such as water. Thus, the pigment composition may be an aqueous dispersion of a pigment and the dispersant composition described above.

Pigments are often categorized by their color strength. For example, carbon blacks may be referred to as high color blacks, medium color blacks, or regular color blacks. Any of these carbon blacks can be used for the pigment composition of the present invention. In a preferred embodiment, the pigment composition comprises carbon products referred to in the art as high color blacks which generally have BET surface area values greater than or equal to about 240 m$^2$/g. Preferably, the high color carbon blacks used in the pigment composition of the present invention have a BET surface area values greater than or equal to about 300 m$^2$/g, more preferably greater than or equal to about 400 m$^2$/g, and most preferably greater than or equal to about 500 m$^2$/g. Examples of high color blacks include, but are not limited to Monarch® 1000, Monarch® 11100, Monarch® 1300, Monarch® 1400, Monarch® 1500, Black Pearls® 1000, Black Pearls® 1100, Black Pearls® 1300, and Black Pearls® 1400.

These so-called high color carbon black also further have defined DBPA (dibutyl phthalate absorption) values. DBPA is a measure of the structure or branching of the carbon product. The greater the structure, in general, the better the dispersibility of the carbon product in, for example, a coating composition. However, the greater the structure, the higher the viscosity of the coating composition. Also, higher structure generally results in poorer color performance—lower gloss and jetness. Thus, preferred high color carbon blacks will have DBPA values between about 50 and 150 cc/100 g. Most preferred are those that further have a DBPA value between about 50 and 100 cc/100 g.

In another preferred embodiment, the pigment composition of the present invention comprises carbon products referred to in the art as medium color blacks and generally have BET surface area values between about 150 m$^2$/g and 240 m$^2$/g. Preferably, the medium color carbon blacks used in the pigment composition of the present invention have BET surface area values between about 170 and 240 m$^2$/g and more preferably between about 200 and 230 m$^2$/g. The medium color blacks further have DBPA values between about 50 and 150 cc/100 g. Most preferred are those that further have a DBPA value between about 60 and 130 cc/100 g. Examples of medium color blacks include, but are not limited to, Monarch® 700, Monarch® 800, Monarch® 880, Monarch® 900, Black Pearls® 700, Black Pearls® 800, Black Pearls® 880, and Black Pearls® 900.

In another embodiment, the pigment composition of the present invention comprises carbon blacks that have been oxidized in order to increase the amount of oxygen functionality on the surface. Oxidized carbon blacks are well known in the art and are typically prepared by the reaction of an oxidant, such as nitric acid or ozone, with a base carbon black. The increase in functionality on the surface typically gives rise to a decrease in pH. Thus, oxidized carbon blacks are typically acidic.

In another embodiment, the pigment composition of the present invention comprises a modified pigment having attached at least one organic group. Preferably, the modified pigment is a modified carbon product. The modified carbon product may have BET surface area values between about 350 and 600 $m^2/g$, and more preferably between about 350 and 500 $m^2/g$. While any modified carbon product with BET surface area values greater than or equal to 350 $m^2/g$ can be used in the pigment composition of the present invention, preferred are those which further have DBPA values between about 60 and 150 cc/100 g. Most preferred are those that further have a DBPA value between 80 and 120 cc/100 g.

The modified carbon products are prepared using methods known to those skilled in the art such that chemical groups (e.g., polymeric and organic) are attached to the pigment, providing a more stable attachment of the groups onto the pigment compared to adsorbed groups, e.g., polymers, surfactants, and the like. For example, the modified carbon products can be prepared using the methods described in U.S. Pat. Nos. 5,554,739, 5,851,280, 6,042,643, 5,707,432, and 5,837,045, and PCT Publication WO 99/23174, the descriptions of which are fully incorporated herein by reference. The modified carbon products can be prepared from any of the carbon products described above. Preferably, the carbon product is either carbon black or an oxidized carbon black.

The attached organic group is chosen depending on a variety of factors, including the specific components of the dispersant composition as well as the intend use of the pigment composition. This allows for greater flexibility by tailoring the modified carbon product to the specific application. The organic group may comprise an ionic group, an ionizable group, or a mixture of an ionic group and an ionizable group. An ionic group is either anionic or cationic and is associated with a counterion of the opposite charge including inorganic or organic counterions such as $Na^+$, $K^+$, $Li^+$, $NH_4^+$, $NR'_4^+$ acetate, $NO_3^-$, $SO_4^{-2}$, $OH^-$, and $Cl^-$, where R' represents hydrogen or an organic group such as a substituted or unsubstituted aryl and/or alkyl group. An ionizable group is one that is capable of forming an ionic group in the medium of use. Thus, preferably the organic group is an organic ionic group. Organic ionic groups include those described in U.S. Pat. No. 5,698,016, the description of which is fully incorporated herein by reference.

Preferably, the organic group comprises at least one anionic group, which is a negatively charged ionic group. Anionic groups may be generated from groups having ionizable substituents that can form anions, such as acidic substituents, or may be the anion in the salts of ionizable substituents. Preferably, when the ionizable substituent forms an anion, the ionizable substituent has a pKa of less than 11. The organic ionic group could further be generated from a species having ionizable groups with a pKa of less than 11 and salts of ionizable substituents having a pKa of less than 11. The pKa of the ionizable substituent refers to the pKa of the ionizable substituent as a whole, not just the acidic substituent. More preferably, the pKa is less than 10 and most preferably less than 9.

Representative examples of ionic groups include $—COO^-$, $—SO_3^-$, $—HPO_3^-$, and $—PO_3^{-2}$. Representative examples of ionizable groups include $—COOH$, $—SO_3H$ $—PO_3H_2$, $—SO_2NH_2$, and $—SO_2NHCOR'$, where R' represents hydrogen or an organic group such as a substituted or unsubstituted aryl and/or alkyl group. Particularly preferred species are $—COO^-$ and $—SO_3^-$. Preferably, the organic ionic group is generated from a substituted or unsubstituted carboxyphenyl group or a substituted or unsubstituted sulfophenyl group. Specific organic ionic groups are $—C_6H_4CO_2^-$ and $—C_6H_4SO_3^-$.

Attached groups comprising ionic or ionizable groups are most preferred when the pigment composition further comprises an aqueous vehicle. In addition, these charged groups are also preferred when the pigment composition is used in an aqueous coating composition, as is described below. Under these conditions, the attached groups can provide increased stability of the carbon product in the vehicle.

The amount of attached groups can be varied depending on the intended use of the pigment composition. For example, the amount of attached organic groups on the modified carbon products is chosen in order to obtain the desired performance the pigment composition in the coating compositions of the present invention. In general, the amount of attached organic groups is from about 0.001 to about 10.0 micromoles of organic group per $m^2$ surface area of pigment (surface area as measured by nitrogen adsorption, and, in particular, the t-area method). Preferably, the amount of attached organic groups is between from about 0.1 to about 5.0 micromoles per $m^2$, and most preferably the amount of attached organic groups is between from about 0.1 to about 2.7 micromoles per m 2. The amount attached can be varied depending on the specific attached group and can be adjusted depending on, for example, the size of the attached group or the functionality of the ionic group. Further, it is also within the scope of the present invention to have more than one type of attached group on the carbon product in order to provide for the best overall performance.

The modified carbon products may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the modified carbon products may be further purified or classified to remove impurities and other undesirable free species which can co-exist in the dispersion as a result of the manufacturing process. For example, a dispersion of the modified carbon product can be subjected to a classification step, such as centrifugation, to substantially remove particles having a size above about 1.0 micron. In addition, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. Also, an optional exchange of counterions whereby the counterions that form a part of the modified carbon products can be exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$. The removal of impurities from the modified carbon products may also improve the performance of the pigment compositions, in particular, in the coating compositions described below.

The pigment compositions may be prepared by any method known to one skilled in the art. In particular, the components may be added in any order. For example, for a pigment composition comprising a modified carbon product, the dispersant composition may either be added to the modified carbon product or vice versa. Also, the dispersant composition may be added anywhere along the process of preparing and isolating the pigment. For example, for a pigment composition comprising a modified carbon product, the dispersant composition may be added either prior to or after a pelletizing step (or other steps for changing the form of the product for improved handling), a drying step, or a pre-packing step.

The dispersant and pigment compositions of the present invention can be used in a variety of applications. Examples include inks, including inkjet inks, coatings, adhesives, plastics, and sealants. In particular, the dispersant and pigment compositions described herein have been found to be useful in aqueous coating applications.

Thus, the present invention relates to an aqueous coating composition comprising an aqueous vehicle, at least one pigment, and at least one dispersant composition. The pigment and dispersant composition are as described above. The pigment can be any pigment described above but is preferably a modified carbon product having attached at least one organic group, such as an anionic group.

In general, as discussed above, a coating composition comprises a pigment dispersed in a solvent and a binder or resin (the vehicle). The vehicle for the coating compositions of the present invention is an aqueous vehicle and comprises an aqueous solvent and a water-based resin. The composition of the vehicle can vary depending on the conditions and requirements for the final coating. For example, the resin content can vary between about 70-100%.

As used herein, the term "water-based" refers to resins or binders that contain, or can contain, an aqueous solvent, such as water. Thus, water-based resins include latexes, waterborne or water soluble resins, and water-reducible resins. Examples of water-based resins or binders useful for the aqueous coating composition of the present invention include, but are not limited to, acrylic resins, alkyd resins, polyurethane resins, epoxy resins, and vinyl-chloride-copolymer resins. The aqueous solvent can include water soluble solvents but is preferably water. The content of the aqueous solvent may vary between nearly 0% and 80%. Preferably the aqueous solvent comprises greater than 50% water, more preferably greater than 70% water, and most preferably greater than 85% water.

The vehicle may also contain optional additives which can be used to improve such properties as viscosity, leveling, and dry time. Examples include cosolvents (in particular, water soluble solvents for aqueous coatings), surfactants, and fillers such as clays, talcs, silicas, and carbonates. Additionally, flow modifiers, leveling aids, and biocides can be added.

The coating compositions of the present invention can be prepared using any technique known to those skilled in the art. Thus, for example, the pigment can be combined with a liquid vehicle and other coating components in a high speed mixer and/or mill. The amount of carbon product used in the coating compositions of the present invention is dependent on the desired performance of the resulting coating. In general, these coating compositions comprise up to about 30% by weight pigment, such as a carbon product. The amount of carbon product can be adjusted in order to optimize such properties as jetness, viscosity, and dispersion stability.

The coating compositions of the present invention can be used in a variety of different end-use applications, such as, for example, automotive topcoats, to give coatings with improved overall performance properties. The pigment compositions of the present invention can be readily dispersed in the coating compositions to obtain coatings with improved jetness and bluetone. This will be further clarified by the following examples, which are intended to be purely exemplary of the present invention.

EXAMPLES

Example 1

This example describes the preparation of an exemplary dispersant composition of the present invention.

To a beaker placed on a hot plate set at 70° C. was added 100 g of NeoCryl BT-24 (a waterborne acrylic resin available from Neoresins) in the presence of 100 grams of water. Once the temperature reached 70° C., 50 g of Unithox 490 (a polyalkylene oxide surfactant available from Baker Petrolite) was slowly added to the stirring solution. After approximately 2 minutes of continuous stirring, a solution of 2.5 g of in 200 grams of water is added. A clear solution was obtained. The mixture was stirred for another 30 minutes while maintaining the temperature at approximately 70° C. 747.5 g of DI water is then added to the mixture and stirred vigorously for another 5 minutes. The resulting dispersant composition was then used for the preparation of a pigment composition, as described in more detail below.

Example 2

This examples describes the preparation of an exemplary pigment composition of the present invention.

A pin pelletizer (10 horsepower) was heated to 70° C. 300 g of Emperor® 2000 pigment black (a modified carbon black having attached $-C_6H_4-SO_3Na$ groups available from Cabot Corporation) was added to the pelletizer chamber and premixed at 400 rpm for 2 minutes. 60 g of the dispersant composition of Example 1 was also added to the chamber, and mixing was continued for another 10 minutes at 500 rpm. The resulting pigment composition was then removed from the chamber, dried at 60-70° C. in an oven for 3 hours, and was used to prepare coating compositions, as described in more detail below.

Example 3 and Comparative Examples 1-5

Example 3 demonstrates the preparation and analysis of an exemplary coating composition of the present invention.

For this example and the comparative examples, the following procedure was followed. A millbase was prepared by premixing 75.63 parts of water with 2.00 parts of Foamaster NX-1 (a defoamer available from Cognis) in the presence of 8.87 parts of Dispersant D1441 (a surfactant available from Baker Petrolite) in a high speed DisperMat mixer with good agitation for 2-3 minutes. To this premix was added 13.5 parts of the desired pigment (shown in Table 1 and Table 2 below) at 2000 rpm for 2 minutes. Then the mixing speed was increased to 4,000 rpm for another 5 minutes. The resulting mixture was then recirculated through an Eiger mill at 10.0 m/s tip speed for 20 minutes at room temperature using zirconium silicate beads (0.6-0.8 mm). The resulting millbase was then used for the preparation of a coating composition.

A coating composition was prepared by mixing 12.0 parts of PnB solvent (available from Lyondell) with 18 parts of Cymel 325 melamine resin (available from Cytec) until a homogeneous solution was achieved. The mixture was added into 300 parts of waterborne polyurethane Neorez R-9624 (available from Neoresin) under good agitation and then mixed for another 20 minutes under good agitation to produce a letdown masterbatch. 71.6 parts of the millbase described above and 330 parts of the letdown masterbatch were mixed together for 15 minutes under good agitation to produce the final coating composition.

A base coat was prepared by spraying out the coating composition onto cold roll steel. This was used for both a mono-coat system and a base coat/clear coat system. For the mono-coat system, the panels were flashed off at room temperature for 10 minutes and force dried at 150° C. for 20 minutes to cure. For the base coat/clear coat system, the panels were flashed off at room temperature for 10 minutes, and force dried at 120° C. for 10 minutes. Then a clear coat was applied on top (based on Macrynal 510, available from UCB). The panels were then flashed off at room temperature for 10 minutes and then cured at 150° C. for another 20 minutes.

Properties of the resulting coatings were measured and are shown in Table 1 and Table 2 below. A Hunter Color Meter was used to measure L (jetness), a (red tone), and b (bluetone) values. A lower L value means a greater level of jetness while the more negative a value for b, the better the bluetone. Mc is the color-dependent black value which can be calculated from L, a, and b. A higher Mc value also indicates a greater level of jetness.

TABLE 1

Mono-coat

| | | Example # | | | | |
|---|---|---|---|---|---|---|
| | Ex. 3 | Comp. 1 | Comp. 2 | Comp. 3 | Comp. 4 | Comp. 5 |
| Pigment* | Ex 2 | R5000 | FW200 | FW285 | M1400 | M1500 |
| Base Coat DFT (mils)* | 0.8-1.0 | 0.8-1.0 | 0.8-1.0 | 0.8-1.0 | 0.8-1.0 | 0.8-1.0 |
| L | 1.43 | 2.31 | 2.20 | 3.15 | 1.94 | 1.98 |
| a | −0.14 | −0.14 | −0.31 | −0.53 | −0.17 | −0.12 |
| b | −0.92 | 0.03 | −0.90 | −0.41 | 0.22 | 0.20 |
| Mc | 295 | 260 | 272 | 251 | 265 | 264 |

*M1400 and M1500 are Monarch ® 1400 carbon black and Monarch ® 1500 carbon black commercially available from Cabot Corporation.
FW200 and FW285 are Color Black FW200 and Color Black FW285 commercially available from Degussa-Huls Corporation.
R5000 is Raven ® 5000 carbon black commercially available from Columbian Chemical Company

TABLE 2

Base coat/clear coat

| | | Example # | | | | |
|---|---|---|---|---|---|---|
| | Ex. 3 | Comp. 1 | Comp. 2 | Comp. 3 | Comp. 4 | Comp. 5 |
| Pigment | Ex. 2 | R5000 | FW200 | FW285 | M1400 | M1500 |
| Base Coat DFT (mils)* | 0.4-0.6 | 0.4-0.6 | 0.4-0.6 | 0.4-0.6 | 0.4-0.6 | 0.4-0.6 |
| Base/Clear Coat DFT (mils)* | 1.4-1.7 | 1.4-1.7 | 1.4-1.7 | 1.4-1.7 | 1.4-1.7 | 1.4-1.7 |
| L | 1.34 | 1.78 | 1.71 | 2.10 | 1.62 | 1.67 |

TABLE 2-continued

Base coat/clear coat

| | | Example # | | | | |
|---|---|---|---|---|---|---|
| | Ex. 3 | Comp. 1 | Comp. 2 | Comp. 3 | Comp. 4 | Comp. 5 |
| a | −0.19 | 0.11 | −0.15 | −0.18 | 0.05 | 0.09 |
| b | −0.66 | 0.03 | −0.27 | 0.05 | 0.21 | 0.14 |
| Mc | 295 | 269 | 277 | 264 | 271 | 271 |

As can be seen from the results in Table 1 and Table 2, the coating composition of Example 3 has a considerably higher Mc value along with a much lower L value in both mono-coat and base coat/clear coat systems. In addition, bluetone is comparable or, in most cases, also improved. Thus, the dispersant compositions of the present invention can be used to prepare pigment compositions which give coating composition with good jetness and bluetone compared to coating compositions of the Comparative Examples.

Example 4 and Comparative Examples 6-10

Example 4 demonstrates the preparation and analysis of an exemplary coating composition of the present invention.

For this example and the comparative examples, a millbase was prepared using a procedure similar to that of Example 3. 30.0 parts of a water grind resin BT24 (available from Neo-resins) was premixed with 57.5 parts of DI water in the presence of 3.0 parts of ammonia and 2.0 parts of Dehydran 1293 (defoamer available from Cognis) in a high speed DisperMat mixer with good agitation for 2-3 minutes. To this premix was added 7.5 parts of the desired pigment (shown in Table 3 and Table 4 below) at 2000 rpm for 2 minutes. Then the mixing speed was increased to 4,000 rpm for another 5 minutes. The mixture was then recirculated through an Eiger mill at 10.0 m/s tip speed for 20 minutes at room temperature using zirconium silicate beads (0.6-0.8 mm). The resulting millbase was then used for the preparation of a coating composition.

A coating composition was prepared by mixing 20 parts of PnB solvent and 16 parts of DPnB solvent (both available from Lyondell) with 37.5 parts of Cymel 373 melamine resin (available from Cytec) until a homogeneous solution was achieved. The mixture was added into 300 parts of waterborne acrylic latex Neocryl XK-100 (available from Neoresin) under good agitation. Wetting agent BYK 346 (available from BYK Chemie) and defoamer Dehydran 1293 (available from Cognis) were post added under good agitation. The mixture was premixed for another 20 minutes under good agitation to produce a letdown masterbatch. 10.0 parts of the millbase described above and 44.75 parts of the letdown masterbatch were mixed together for 15 minutes under good agitation to produce the final coating composition.

A base coat was prepared by spraying out the coating composition onto cold roll steel. This was used for both a mono-coat system and a base coat/clear coat system. For the mono-coat system, the panels were flashed off at room temperature for 10 minutes and force dried at 150° C. for 20 minutes to cure. For the base coat/clear coat system, the panels were flashed off at room temperature for 10 minutes, and force dried at 120° C. for 10 minutes. Then a clear coat was applied on top top (based on Macrynal 510, available from UCB). The panels were then flashed off at room temperature for 10 minutes and then cured at 150° C. for another 20 minutes.

Properties of the coating were measured and are shown in Table 3 and Table 4 below. A Hunter Color Meter was used to measure L (jetness), a (red tone), and b (bluetone) values. A lower L value means a greater level of jetness while the more negative a value for b, the better the bluetone. Mc is the color-dependent black value which can be calculated from L, a, and b. A higher Mc value also indicates a greater level of jetness.

TABLE 3

Mono-coat

| | | Example # | | | | |
|---|---|---|---|---|---|---|
| | Ex. 4 | Comp. 6 | Comp. 7 | Comp. 8 | Comp. 9 | Comp. 10 |
| Pigment | Ex. 2 | M1400 | M1500 | FW285 | R5000 | M1300 |
| Base Coat DFT (mils)* | 0.8-1.0 | 0.8-1.0 | 0.8-1.0 | 0.8-1.0 | 0.8-1.0 | 0.8-1.0 |
| L | .98 | 1.21 | 1.35 | 1.47 | 1.48 | 1.39 |
| a | −0.14 | 0.09 | 0.13 | 0.00 | 0.00 | 0.08 |
| b | −0.95 | −0.41 | −0.42 | −0.42 | −0.52 | −0.44 |
| Mc | 317 | 294 | 289 | 286 | 287 | 288 |

*M1300, M1400, and M1500 are Monarch ® 1300 carbon black, Monarch ® 1400 carbon black, and Monarch ® 1500 carbon black commercially available from Cabot Corporation. FW285 is Color Black FW285 commercially available from Degussa-Huls Corporation. R5000 is Raven ® 5000 carbon black commercially available from Columbian Chemical Company

TABLE 4

Base coat/clear coat

| | | Example # | | | | |
|---|---|---|---|---|---|---|
| | Ex. 4 | Comp. 6 | Comp. 7 | Comp. 8 | Comp. 9 | Comp. 10 |
| Pigment | Ex. 2 | M1400 | M1500 | FW285 | R5000 | M1300 |
| Base Coat DFT (mils)* | 0.4-0.6 | 0.4-0.6 | 0.4-0.6 | 0.4-0.6 | 0.4-0.6 | 0.4-0.6 |
| Base/Clear Coat DFT (mils)* | 1.4-1.7 | 1.4-1.7 | 1.4-1.7 | 1.4-1.7 | 1.4-1.7 | 1.4-1.7 |
| L | 1.17 | 1.21 | 1.29 | 1.46 | 1.40 | 1.45 |
| a | −0.02 | 0.04 | 0.00 | 0.05 | −0.07 | 0.05 |
| b | −1.11 | −0.69 | −0.23 | −0.40 | −0.25 | −0.27 |
| Mc | 308 | 299 | 289 | 285 | 286 | 284 |

As can be seen from the results in Table 3 and Table 4, the coating composition of Example 4 has a considerably higher Mc value along with a much lower L value in both mono-coat and base coat/clear coat systems. In addition, bluetone is also improved. Thus, the dispersant compositions of the present invention can be used to prepare pigment compositions which give coating composition with good jetness and bluetone compared to coating compositions of the Comparative Examples.

As a result, coating compositions of the present invention, containing the pigment compositions and dispersant compositions described herein, have been found to provide high color performance in coating applications.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. A pigment composition comprising a) at least one pigment, and b) at least one dispersant composition comprising i) at least one nonionic surfactant which is insoluble in water and ii) at least one polymer comprising at least one salt of a carboxylic acid group which is soluble in water, wherein the non-ionic surfactant is a polyalkylene oxide that is greater than 90% capped and has a molecular weight between about 2500 and 10000, and wherein the pigment is a modified carbon product comprising a carbon product having attached at least one organic group.

2. The pigment composition of claim 1, wherein the organic group comprises at least one ionic group, at least one ionizable group, or a mixture thereof.

3. The pigment composition of claim 1, wherein the organic group comprises at least one anionic group.

4. The pigment composition of claim 1, wherein the organic group comprises at least one carboxylic group, a sulfonate group, or salts thereof.

5. The pigment composition of claim 1, wherein the organic group is a carboxyphenyl group, a sulfophenyl group, or salts thereof.

6. The pigment composition of claim 1, further comprising an aqueous vehicle.

7. The pigment composition of claim 6, wherein the aqueous vehicle is water.

8. The pigment composition of claim 1, wherein the non-ionic surfactant is a polyalkylene oxide, the polymer is an ammonium salt of a copolymer of acrylic acid and methylmethacrylate, and the pigment is a modified carbon product comprising a carbon product having attached at least one sulfonate group.

9. An aqueous coating composition comprising a) an aqueous vehicle comprising a water-based resin and an aqueous solvent, b) at least one pigment, and c) at least one dispersant composition comprising i) at least one nonionic surfactant which is insoluble in water and ii) at least one polymer comprising at least one salt of a carboxylic acid group which is soluble in water, wherein the non-ionic surfactant is a polyalkylene oxide that is greater than 90% capped and has a molecular weight between about 2500 and 10000, and wherein the pigment is a modified carbon product comprising a carbon product having attached at least one organic group.

10. The aqueous coating composition of claim 9, wherein the water-based resin is an acrylic resin, a polyurethane resin, an epoxy resin, a polyester resin, an alkyd resin, or a vinyl chloride-copolymer resin.

11. The aqueous coating composition of claim 9, wherein the water-based resin is an acrylic latex.

12. The aqueous coating composition of claim 9, wherein the aqueous solvent is greater than 70% water.

13. The aqueous coating composition of claim 9, wherein the aqueous solvent is greater than 85% water.

14. The aqueous coating composition of claim 9, wherein the organic group comprises at least one ionic group, at least one ionizable group, or a mixture thereof.

15. The aqueous coating composition of claim 9, wherein the organic group comprises an anionic group.

16. The aqueous coating composition of claim 9, wherein the organic group comprises a carboxylic group, a sulfonate group, or salts thereof.

17. The aqueous coating composition of claim 9, wherein the organic group is a carboxyphenyl group, a sulfophenyl group, or salts thereof.

18. The aqueous coating composition of claim 9, wherein the nonionic surfactant is a polyalkylene oxide, the polymer is an ammonium salt of a copolymer of acrylic acid and methylmethacrylate, and the pigment is a pigment is a modified carbon product comprising a carbon product having attached at least one sulfonate group.

* * * * *